(12) United States Patent
Akashi et al.

(10) Patent No.: US 10,437,539 B2
(45) Date of Patent: Oct. 8, 2019

(54) IMAGE FORMING APPARATUS

(71) Applicant: Konica Minolta, Inc., Chiyoda-ku, Tokyo (JP)

(72) Inventors: Hironori Akashi, Okazaki (JP); Ryutaro Taira, Okazaki (JP); Hironao Miyamoto, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/861,312

(22) Filed: Jan. 3, 2018

(65) Prior Publication Data
US 2018/0189007 A1 Jul. 5, 2018

(30) Foreign Application Priority Data
Jan. 4, 2017 (JP) .................. 2017-000224

(51) Int. Cl.
G06F 3/12 (2006.01)
G03G 21/16 (2006.01)

(52) U.S. Cl.
CPC ....... *G06F 3/1288* (2013.01); *G03G 21/1604* (2013.01); *G03G 21/1619* (2013.01); *G06F 3/1204* (2013.01); *G06F 3/1206* (2013.01); *G06F 3/1222* (2013.01); *G06F 3/1238* (2013.01); *G03G 21/1652* (2013.01)

(58) Field of Classification Search
CPC ......... B41J 11/48; B41J 15/22; G07G 1/0018; G07G 5/00; A47B 21/00; A47B 2200/0073; F21V 33/0052; G06F 1/1632
USPC ....................... 358/1.15, 442, 443
See application file for complete search history.

(56) References Cited

U.S. PATENT DOCUMENTS

| | | | | |
|---|---|---|---|---|
| 6,169,655 B1* | 1/2001 | Helot | ..................... | A47B 21/00 312/223.2 |
| 6,659,454 B1* | 12/2003 | Smith | ................... | B41J 13/106 271/207 |
| 6,727,996 B1* | 4/2004 | Silverbrook | ......... | B41J 2/16511 358/1.1 |
| 7,158,248 B2* | 1/2007 | Smith | ...................... | G06F 8/61 358/1.15 |
| 7,505,172 B2* | 3/2009 | Vondran, Jr. | .......... | G06F 3/1212 358/1.9 |
| 2002/0077979 A1* | 6/2002 | Nagata | ................... | G06Q 10/06 705/40 |

(Continued)

FOREIGN PATENT DOCUMENTS

CN 101183476 A 5/2008
JP 2002192802 A 7/2002
(Continued)

OTHER PUBLICATIONS

CNIPA Office Action received in corresponding CN Application 201810007064.2 dated Mar. 28, 2019.

*Primary Examiner* — Negussie Worku
(74) *Attorney, Agent, or Firm* — Cantor Colburn LLP

(57) ABSTRACT

An image forming apparatus includes: an image forming unit configured to form an image on a recording medium; a server unit having a server function; a casing having the image forming unit housed therein; and a cabinet arranged below the casing and having the server unit housed therein. The cabinet serves as a partition between the image forming unit and the server unit, and is provided as a housing separately from the casing.

11 Claims, 6 Drawing Sheets

(56) References Cited

U.S. PATENT DOCUMENTS

| | | | |
|---|---|---|---|
| 2004/0218208 A1* | 11/2004 | Akiyoshi | G06F 8/41 |
| | | | 358/1.15 |
| 2010/0097649 A1* | 4/2010 | Akiyama | G06F 3/1205 |
| | | | 358/1.15 |
| 2011/0044705 A1* | 2/2011 | Akashi | G03G 15/0131 |
| | | | 399/27 |
| 2013/0077985 A1* | 3/2013 | Arai | G03G 15/01 |
| | | | 399/89 |
| 2013/0235412 A1* | 9/2013 | Baldwin | G06F 3/1238 |
| | | | 358/1.14 |
| 2013/0322896 A1* | 12/2013 | Mamiya | G03G 15/09 |
| | | | 399/27 |
| 2014/0185082 A1* | 7/2014 | Yamada | G06F 3/1206 |
| | | | 358/1.14 |
| 2015/0235518 A1* | 8/2015 | Pececnik | G07F 17/3244 |
| | | | 463/20 |
| 2016/0179047 A1* | 6/2016 | Anderson | G03G 21/1878 |
| | | | 399/74 |

FOREIGN PATENT DOCUMENTS

| | | |
|---|---|---|
| JP | 2009054066 A | 3/2009 |
| JP | 4918435 B2 | 4/2012 |

\* cited by examiner

IMAGE FORMING APPARATUS

CROSS REFERENCE TO RELATED APPLICATION

The present invention claims priority under 35 U.S.C. § 119 to Japanese Application No. 2017-000224, filed Jan. 4, 2017, the entire contents of which is incorporated herein by reference.

BACKGROUND

Technological Field

The present invention relates to an image forming apparatus.

Description of the Related Art

Regarding conventional image forming apparatuses, for example, Japanese Laid-Open Patent Publication No. 2009-54066 discloses an image forming apparatus aiming at improving convenience.

The image forming apparatus disclosed in Japanese Laid-Open Patent Publication No. 2009-54066 includes a multi-functional peripheral (MFP) having a plurality of functions such as a copy function, a facsimile function, a printer function, and a scanner function. The MFP is provided with a housing unit capable of housing a portable terminal device such as a notebook personal computer, a mobile personal computer and the like. The housing unit is opened and closed by an opening and closing door formed on the side portion of the MFP.

SUMMARY

Image forming apparatuses with which various kinds of hardware resources are associated have been proposed. For example, in the image forming apparatus disclosed in the above-mentioned Japanese Laid-Open Patent Publication No. 2009-54066, a terminal device such as a notebook personal computer and a mobile personal computer is provided to be attachable to and detachable from the MFP in order to allow effective use of the user's hardware resources. However, since such a terminal device is housed on the side portion of the MFP, the heat generated due to image formation may have an adverse effect on the terminal device.

Accordingly, the present invention has been made to solve the above-described problems, and aims to provide an image forming apparatus configured to suppress an adverse effect on a server unit integrally provided in the image forming apparatus by the heat generated due to image formation.

To achieve at least one of the above-mentioned objects, according to an aspect of the present invention, an image forming apparatus reflecting one aspect of the present invention comprises: an image forming unit configured to form an image on a recording medium; a server unit having a server function; a casing having the image forming unit housed therein; and a cabinet arranged below the casing and having the server unit housed therein. The cabinet is configured to serve as a partition between the image forming unit and the server unit and provided as a housing separately from the casing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
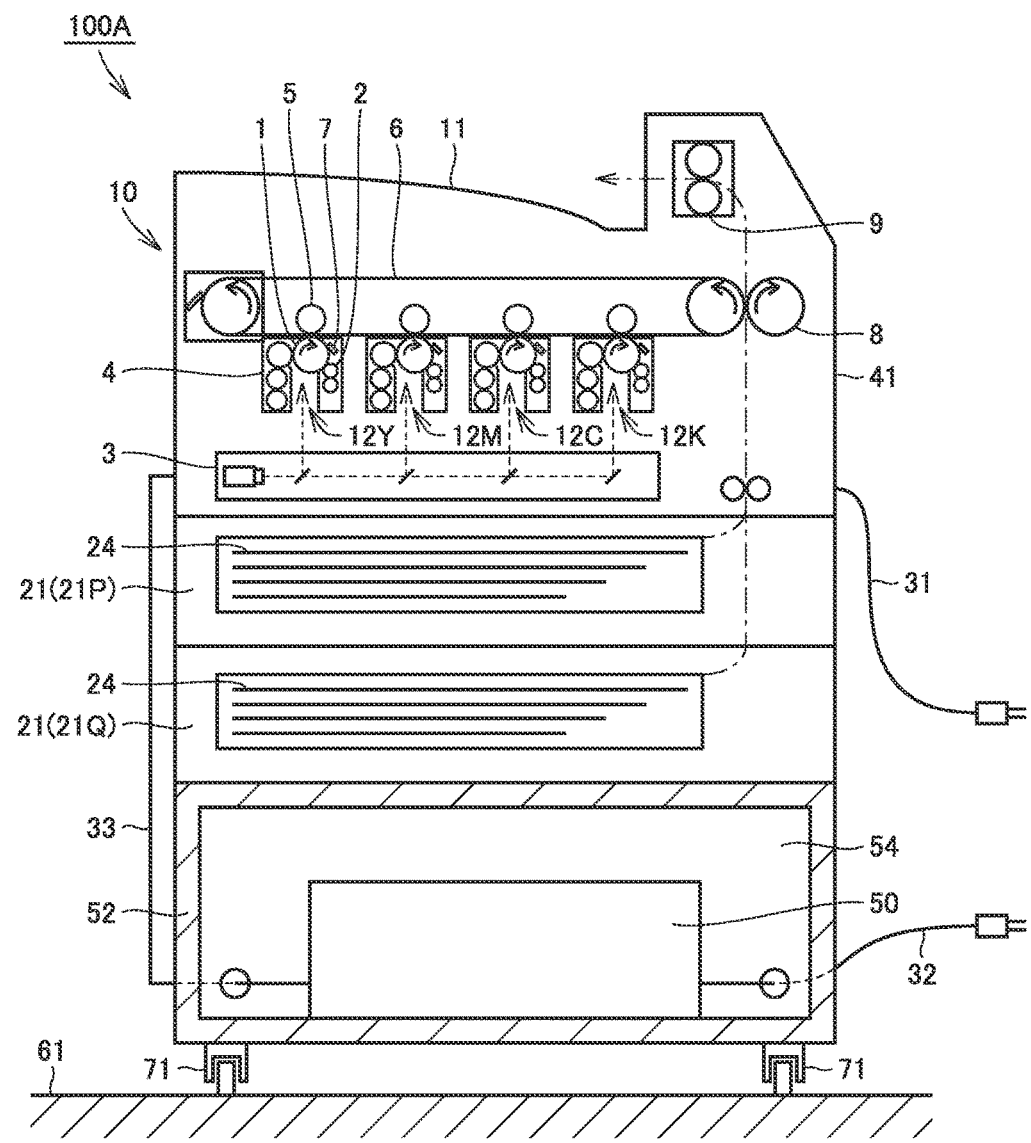
FIG. 1 is a cross-sectional view schematically showing the internal structure of an image forming apparatus in the first embodiment of the present invention.

Hereinafter, one or more embodiments of the present invention will be described with reference to the drawings. However, the scope of the invention is not limited to the disclosed embodiments. In the accompanying drawings referred to in the following description, the same or corresponding components are designated by the same reference characters.

(First Embodiment)

Figure 2:
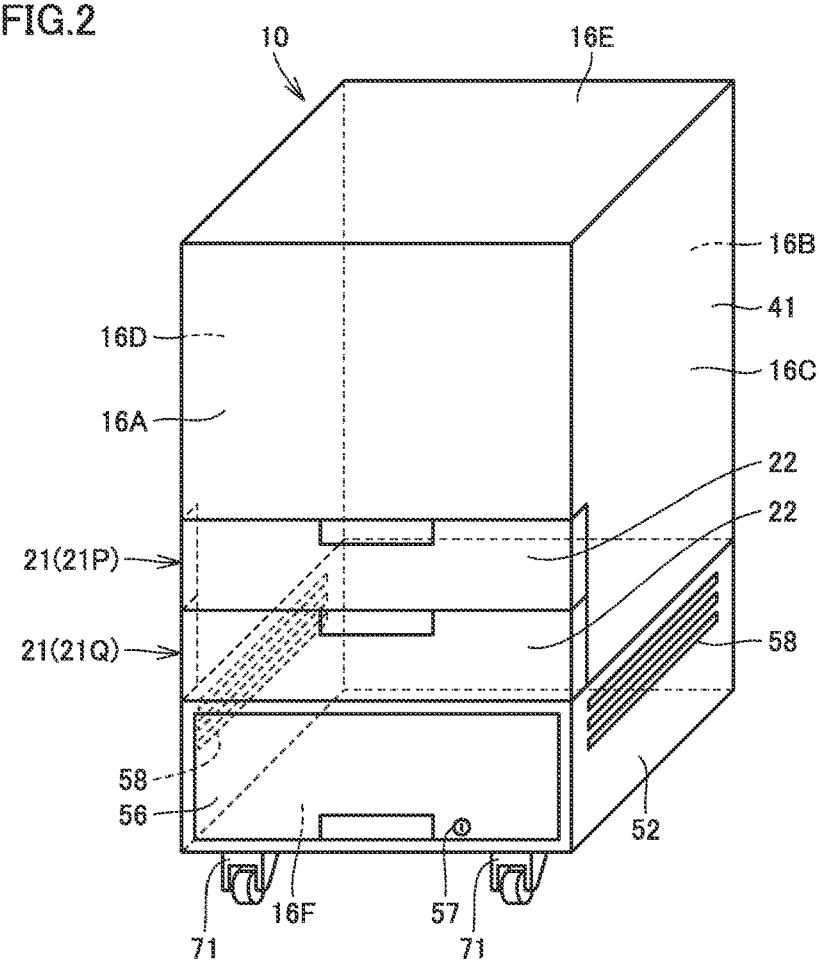
FIG. 2 is a perspective view schematically showing the external appearance of the image forming apparatus in FIG. 1.

FIG. 1 is a cross-sectional view schematically showing the internal structure of an image forming apparatus in the first embodiment of the present invention. FIG. 2 is a perspective view schematically showing the external appearance of the image forming apparatus in FIG. 1.

Referring to FIGS. 1 and 2, an image forming apparatus 100A in the present embodiment includes: an image forming unit 10 configured to form an image on a sheet of paper 24 as a recording medium; and a server unit 50 as hardware having a server function.

Image forming unit 10 is an MFP (multifunctional peripherals) having a plurality of functions such as a copy function, a facsimile function, a printer function, and a scanner function.

Image forming unit 10 includes image forming units 12Y, 12M, 12C, and 12K, an intermediate transfer belt 6, a secondary transfer roller 8, a fixing device 9, a paper discharge tray 11, a paper feed tray 21P, and a paper feed tray 21Q. If paper feed tray 21P and paper feed tray 21Q are not particularly distinguished from each other, paper feed tray 21P and paper feed tray 21Q are simply referred to as a "paper feed tray 21".

Each of image forming units 12Y, 12M, 12C, and 12K includes a photoreceptor 1 (an image carrier), a charging device 2, an exposure device 3, a developing device 4, a primary transfer roller 5, and a cleaning blade 7. Image forming units 12Y, 12M, 12C, and 12K each use the above-mentioned devices to form toner images colored in yellow (Y), magenta (M), cyan (C), and black (K), respectively, on the surface of intermediate transfer belt 6.

The toner images in their respective colors are overlaid on one another on the surface of intermediate transfer belt 6. Then, intermediate transfer belt 6 conveys the obtained color toner image to a secondary transfer unit between intermediate transfer belt 6 and secondary transfer roller 8.

Paper feed tray 21 is provided as a housing unit in which sheet of paper 24 as a recording medium is housed. Paper feed tray 21 houses a plurality of sheets of paper 24. Typically, sheets of paper 24 housed in paper feed tray 21P are different in size from sheets of paper 24 housed in paper feed tray 21Q. Paper feed tray 21 is provided at the lowermost part of image forming unit 10. Paper feed tray 21P and paper feed tray 21Q are arranged one above the other.

The present embodiment has been described with regard to the configuration in which two stages of paper feed trays 21 are arranged, though not limited thereto. Alternatively, one stage of paper feed tray 21 may be arranged, or three or more stages of paper feed trays 21 may be arranged.

Sheet of paper 24 housed in paper feed tray 21 is conveyed via various types of rotary rollers to the secondary transfer unit between intermediate transfer belt 6 and secondary transfer roller 8. The color toner image carried on intermediate transfer belt 6 is transferred onto the surface of sheet of paper 24 in the secondary transfer unit. The color toner image is fixed by fixing device 9 onto the surface of sheet of paper 24. Sheet of paper 24 having an image formed thereon through the above-described process is discharged onto paper discharge tray 11.

Image forming unit 10 further has a casing 41. Casing 41 has a housing shape and exhibits an external appearance of image forming unit 10. Various devices forming the above-described image forming unit 10 are housed in casing 41.

Server unit 50 is hardware having a plurality of server functions such as a database server, a Web server, an application server, and an FTP server (file server). Server unit 50 includes a network IF. Server unit 50 is configured to be connectable through this network IF to an external network.

Server unit 50 is configured to be capable of transmitting and receiving data to and from image forming unit 10 through a data communication line 33. For example, the document stored in server unit 50 can be transmitted to image forming unit 10 so as to form an image of the document on sheet of paper 24 in image forming unit 10, or the data scanned in image forming unit 10 can be transmitted to server unit 50 so as to be stored in server unit 50.

Image forming apparatus 100A includes: a first power supply unit 31 for supplying electric power to image forming unit 10; and a second power supply unit 32 for supplying electric power to server unit 50. First power supply unit 31 and second power supply unit 32 are provided independently from each other.

First power supply unit 31 and second power supply unit 32 each are formed of a power cord, for example. The electric power from a commercial power supply or the like is supplied to image forming unit 10 through first power supply unit 31. The electric power from a commercial power supply or the like is supplied to server unit 50 through second power supply unit 32.

By such a configuration, server unit 50 connected to the external network can be operated irrespective of whether electric power is supplied or not to image forming unit 10.

Then, arrangement of image forming unit 10 and server unit 50 in image forming apparatus 100A will be hereinafter described.

Server unit 50 is disposed below image forming unit 10. Specifically, image forming unit 10 is provided at the upper stage in image forming apparatus 100A while server unit 50 is provided at the lower stage in image forming apparatus 100A.

Image forming apparatus 100A further includes a cabinet 52. Cabinet 52 is provided so as to serve as a partition between image forming unit 10 and server unit 50. Cabinet 52 is formed in a housing shape providing an internal space 54 in which server unit 50 is housed. Cabinet 52 exhibits an external appearance of a part (a lower portion) of image forming unit 10. Cabinet 52 is provided as a housing separately from casing 41 of image forming unit 10.

Cabinet 52 (server unit 50) is provided directly below paper feed tray 21. Paper feed tray 21 is provided in the vertical direction between image forming units 12Y, 12M, 12C, 12K and cabinet 52 (server unit 50).

Typically, image forming apparatus 100A has an approximately rectangular parallelepiped shape as a whole. Image forming apparatus 100A has a side surface 16A, a side surface 16B, a side surface 16C, a side surface 16D, a top surface 16E, and a bottom surface 16F.

Side surface 16A, side surface 16B, side surface 16C, and side surface 16D are arranged to face laterally (in the horizontal direction). Side surface 16A normally faces toward the front surface side of image forming apparatus 100A, which corresponds to the side on which the user of image forming apparatus 100A is to stand. Side surface 16B is arranged on the back side of side surface 16A. Side surface 16C and side surface 16D are arranged to extend between side surface 16A and side surfaces 16B. Side surface 16D is arranged on the back side of side surface 16C.

Top surface 16E is arranged to face vertically upward. On top surface 16E, paper discharge tray 11 of image forming unit 10 is provided. Bottom surface 16F is arranged on the back side of top surface 16E so as to face vertically downward. Bottom surface 16F is arranged to face a floor 61 on which image forming apparatus 100A is placed. Bottom surface 16F is formed by cabinet 52.

Paper feed tray 21 is provided such that it can be opened and closed at side surface 16A. More specifically, paper feed tray 21 in the closed state is pulled out from side surface 16A in the frontward direction, thereby brought into an opened state. Then, in this opened state, sheets of paper 24 are supplied into paper feed tray 21.

Image forming apparatus 100A further includes a plurality of casters (wheels) 71. Casters 71 each are provided as a transportation member used for transporting image forming apparatus 100A. Casters 71 are provided at the lowermost part of cabinet 52. Casters 71 are provided on bottom surface 16F. Typically, four casters 71 are provided at four corners of bottom surface 16F.

Figure 3:
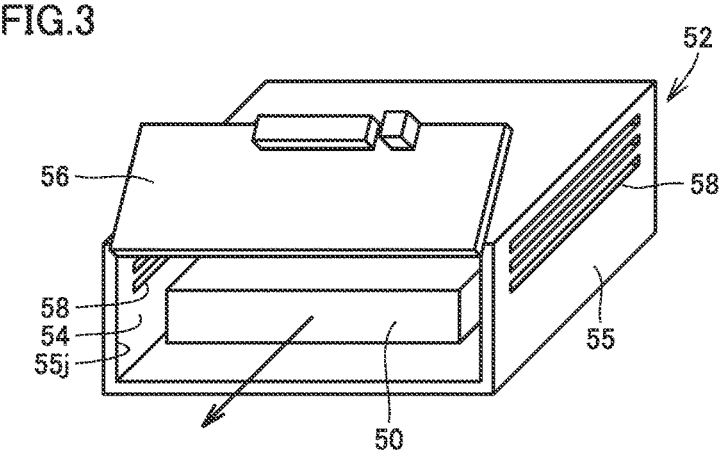
FIG. 3 is a perspective view showing the manner of removing a server unit from inside a cabinet in FIGS. 1 and 2.

FIG. 3 is a perspective view showing the manner of removing the server unit from inside the cabinet in FIGS. 1 and 2.

Referring to FIGS. 1 to 3, cabinet 52 has a cabinet body 55 and a door unit 56. Cabinet body 55 is formed in a housing shape having an opening 55j that opens in one direction. Door unit 56 is provided such that opening 55j can be opened and closed. When door unit 56 is opened, server unit 50 housed in internal space 54 becomes accessible through opening 55j.

FIG. 3 shows door unit 56 attached by hinges to cabinet body 55 so as to be pivotable, though not limited thereto. For example, a door unit mounted to be attachable to and detachable from cabinet body 55 may be used, or a sliding-type door unit may be used.

Door unit 56 is provided such that it can be opened and closed at side surface 16A. Since cabinet 52 having server unit 50 housed therein is arranged below image forming unit 10, the side surface from which server unit 50 is pulled into and out of cabinet 52 can be selected with high flexibility from among side surfaces 16A to 16D of cabinet 52. Particularly in the present embodiment, the operator can open and close door unit 56 on the front surface side of image forming apparatus 100A, which is the same side as that on which the operator opens and closes paper feed tray 21. This allows easy access to server unit 50 housed in internal space 54, so that the maintenance performance for server unit 50 can be improved.

Cabinet 52 further includes a lock mechanism unit 57. Lock mechanism unit 57 is provided in door unit 56 and cabinet body 55. Lock mechanism unit 57 is configured to restrict the operation to bring door unit 56 from the closed state into the opened state.

The figure shows lock mechanism unit 57 that allows a locking operation and an unlocking operation for door unit 56 to be performed by insertion of a key, though not limited thereto. For example, a dial-type lock mechanism unit may be used, or a lock mechanism unit including operation keys for inputting a personal identification number may be used.

Lock mechanism unit 57 is configured such that the locking operation and the unlocking operation for door unit 56 can be performed at side surface 16A. More specifically, an insertion hole of the key used for the locking operation and the unlocking operation in lock mechanism unit 57 is provided on side surface 16A.

The key used for the locking and unlocking operations in lock mechanism unit 57 is managed by a specific manager, so that the security performance for server unit 50 can be enhanced. On the other hand, for accessing server unit 50 housed in internal space 54, the operator can operate lock mechanism unit 57 on the front surface side of image forming apparatus 100A, which is the same side as that on which the operator opens and closes paper feed tray 21. Accordingly, the maintenance performance for server unit 50 can also be kept high.

Cabinet 52 is provided with an air vent 58. Air vent 58 is formed of an opening that allows communication between the inside and the outside of cabinet 52. Typically, inside cabinet 52, a fan (not shown) is provided for forcefully causing air to flow between the inside and the outside of cabinet 52.

In the present embodiment, air vent 58 is provided in each of side surface 16C and side surface 16D. Air vent 58 may be provided in side surface 16A (door unit 56), may be provided in side surface 16B, or may be provided in bottom surface 16F. Air vent 58 may be provided in only one surface, or may be provided in a plurality of surfaces that are different from the combination of side surface 16C and side surface 16D.

As described above, in image forming apparatus 100A in the present embodiment, server unit 50 is arranged below image forming unit 10. Such a configuration allows the following effects (1) to (4) to be achieved.

(1) Countermeasures Against Heat

The heat generated in image forming unit 10 is less likely to flow around to server unit 50. More specifically, the air having a temperature raised by exhaust heat from image forming unit 10 is less likely to flow into cabinet 52 through air vent 58.

In general, the amount of heat generated in image forming unit 10 is greater than the amount of heat generated in server unit 50 (particularly, the heat is significantly generated in fixing device 9).

(2) Countermeasures Against Exhaust Air

Since each of side surfaces 16A to 16D and bottom surface 16F of cabinet 52 can be utilized as a side surface in which air vent 58 is provided, the direction of air exhausted from cabinet 52 can be set with high flexibility.

(3) Countermeasures Against Vibration

Typically, server unit 50 is arranged at a position lower than the center of gravity of image forming apparatus 100A. Thus, server unit 50 is less likely to be influenced by vibrations resulting from earthquakes and vibrations from peripheral devices.

(4) Countermeasures Against Damage

Server unit 50 is provided at a relatively low position. Accordingly, even if server unit 50 is dropped during maintenance, server unit 50 can be less damaged.

Furthermore, in image forming apparatus 100A in the present embodiment, server unit 50 is housed in cabinet 52 provided as a housing separately from casing 41 of image forming unit 10. By such a configuration, in addition to the above-described effects (1) to (4), image forming unit 10 and server unit 50 are less likely to exert an influence on each other by heat and vibration occurring in each of image forming unit 10 and server unit 50.

The following is a summarized explanation of the structure of image forming apparatus 100A in the first embodiment of the present invention. Specifically, image forming apparatus 100A in one aspect of the present embodiment includes: image forming unit 10 configured to form an image on sheet of paper 24 as a recording medium; server unit 50 having a server function; a casing 41 having image forming unit 10 housed therein; and cabinet 52 arranged below casing 41 and having server unit 50 housed therein. Cabinet 52 serves as a partition between image forming unit 10 and server unit 50 and is provided as a housing separately from casing 41.

Furthermore, image forming apparatus 100A in another aspect of the present embodiment includes: image forming unit 10 configured to form an image on sheet of paper 24 as a recording medium; server unit 50 having a server function; and cabinet 52 provided as a partition member serving as a partition between image forming unit 10 and server unit 50. Server unit 50 is arranged below image forming unit 10.

The present embodiment has been described with regard to the case where cabinet 52 is provided as a partition member serving as a partition between image forming unit 10 and server unit 50, but the image forming apparatus in another aspect of the present embodiment is not limited to this case. In the configuration in which image forming unit 10 and server unit 50 are housed in a single casing, a partition plate may be provided inside the casing so as to serve as a partition between image forming unit 10 and server unit 50.

(Second Embodiment)

Figure 4:
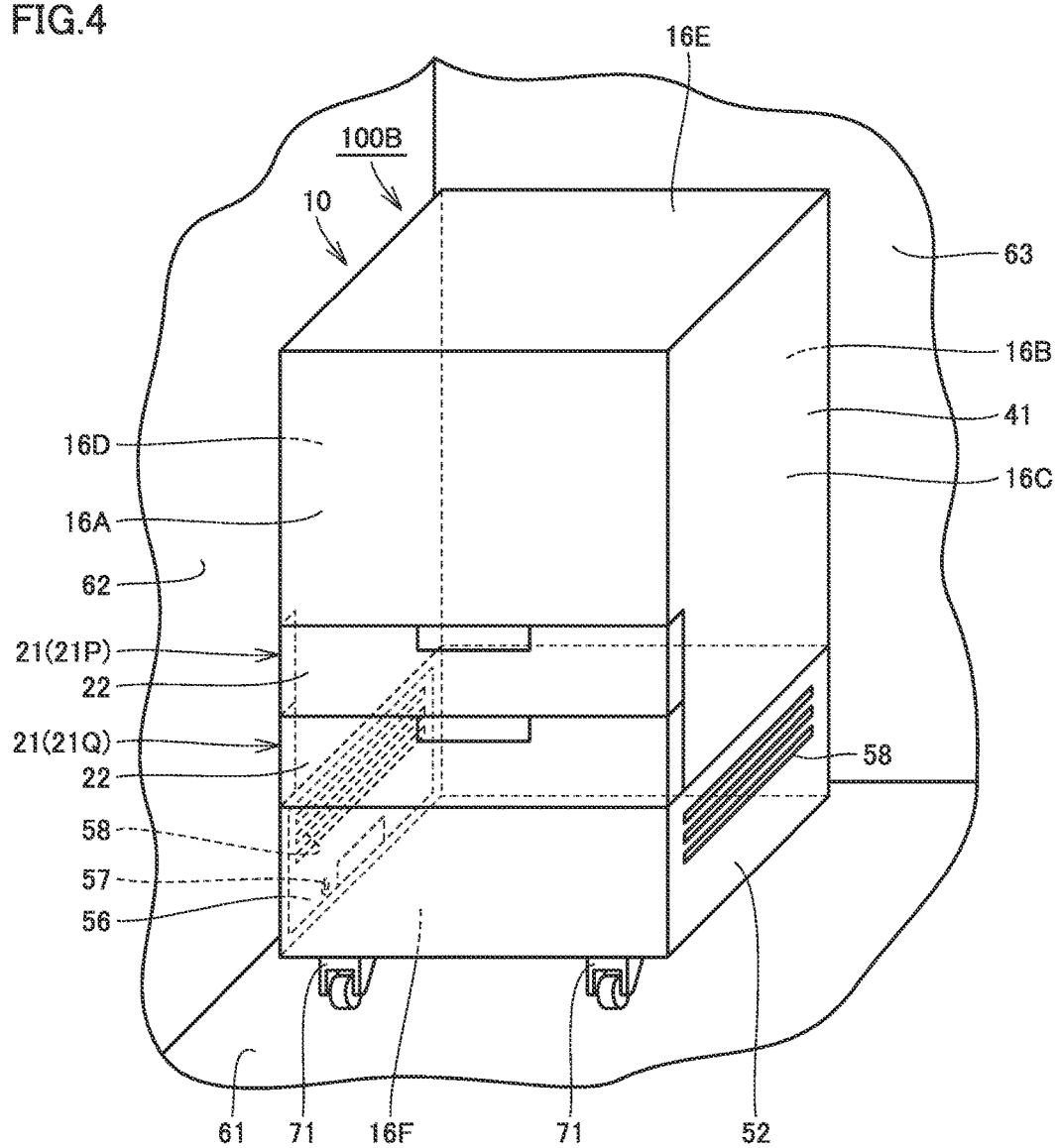
FIG. 4 is a perspective view schematically showing the external appearance of an image forming apparatus in the second embodiment of the present invention.

FIG. 4 is a perspective view schematically showing the external appearance of an image forming apparatus in the second embodiment of the present invention. The image forming apparatus in the present embodiment has a structure basically similar to that of image forming apparatus 100A in the first embodiment. The description of the identical structure will not be hereinafter repeated.

Referring to FIG. 4, in an image forming apparatus 100B in the present embodiment, a door unit 56 is provided on side surface 16D such that it can be opened and closed.

Image forming apparatus 100B is placed at a corner area formed by a floor 61 and wall portions 62 and 63 that rise from floor 61. In such an arrangement, side surface 16D of image forming apparatus 100B faces wall portion 62 with a gap provided therebetween while side surface 16B of image forming apparatus 100B faces wall portion 63 with a gap provided therebetween.

According to the above-described configuration, the operator cannot open and close door unit 56 on the front surface side of image forming apparatus 100A, which is the same side as that on which the operator opens and closes paper feed tray 21. Particularly in the present embodiment, side surface 16D provided with door unit 56 is arranged to face wall portion 62. Thus, when door unit 56 is to be opened and closed, image forming apparatus 100B needs to be moved such that side surface 16D is distanced from wall portion 62. Accordingly, the security performance for server unit 50 can be enhanced.

According to image forming apparatus 100B in the second embodiment of the present invention configured in this way, the effect described in the first embodiment can be similarly achieved.

In addition, the arrangement of door unit 56 is not limited to those described in the first embodiment and the second embodiment. For example, door unit 56 may be provided on side surface 16B located on the back side of the image forming apparatus.

Furthermore, door unit 56 may be provided on a plurality of side surfaces (by way of example, side surface 16C and side surface 16D). In this case, door unit 56 not interfering with a wall portion can be selected in accordance with the position where the image forming apparatus is placed. Accordingly, the maintenance performance for server unit 50 can be preferentially improved.

(Third Embodiment)

Figure 5:
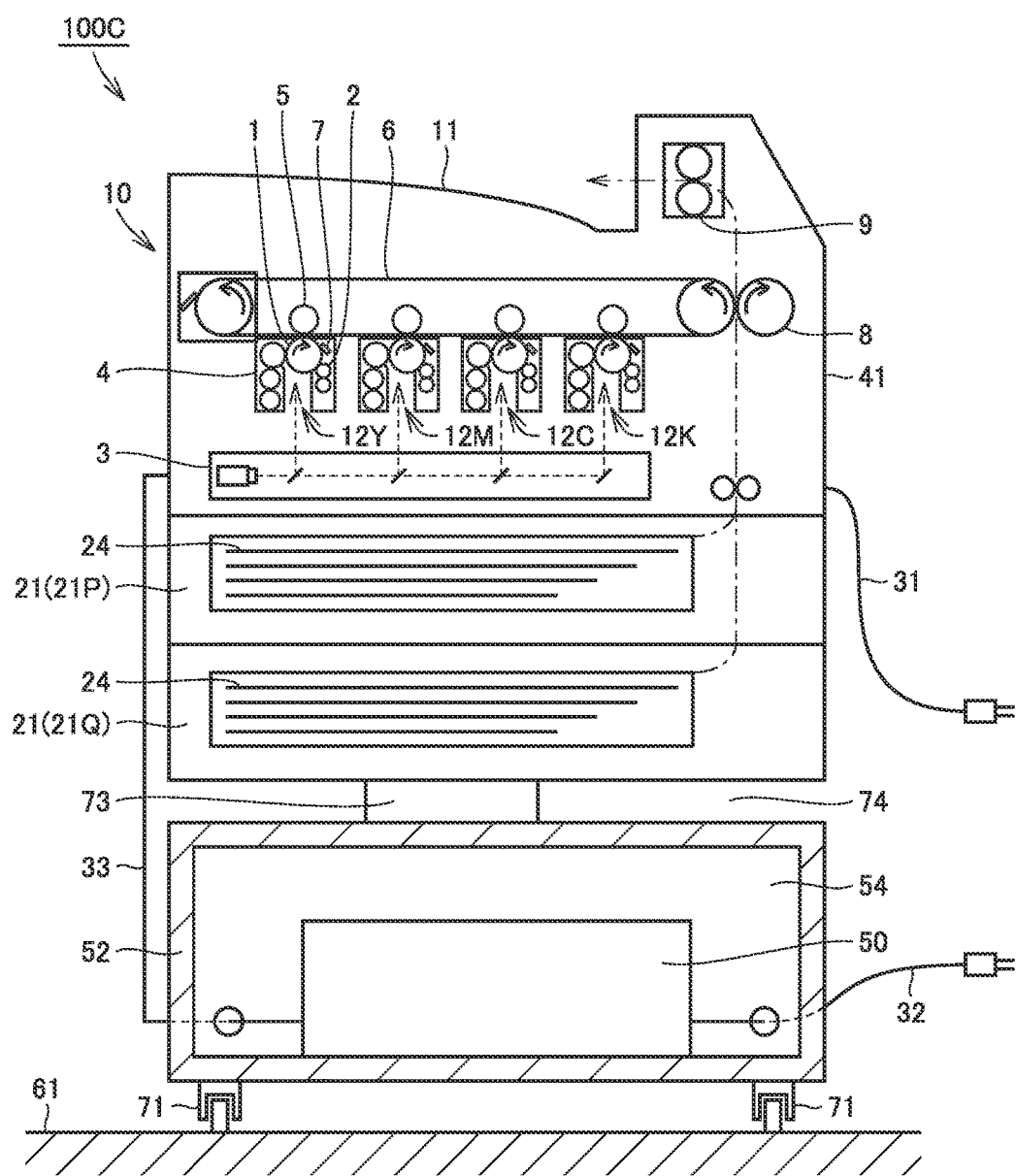
FIG. 5 is a cross-sectional view schematically showing the internal structure of an image forming apparatus in the third embodiment of the present invention.

FIG. 5 is a cross-sectional view schematically showing the internal structure of the image forming apparatus in the third embodiment of the present invention. The image forming apparatus in the present embodiment has a structure basically similar to that of image forming apparatus 100A in the first embodiment. The description of the identical structure will not be hereinafter repeated.

Referring to FIG. 5, an image forming apparatus 100C in the present embodiment further includes a spacer member 73. Spacer member 73 is interposed between image forming unit 10 (more specifically, casing 41) and cabinet 52.

Spacer member 73 has an area smaller than each of casing 41 and cabinet 52 as seen in plan view of image forming apparatus 100C. Spacer member 73 extends in a pillar shape from cabinet 52 toward casing 41. Spacer member 73 is provided such that a space 74 is provided between casing 41 and cabinet 52.

According to such a configuration, the contact area between cabinet 52 and casing 41 is decreased, so that image forming unit 10 and server unit 50 are further less likely to exert an influence on each other by heat and vibration occurring in each of image forming unit 10 and server unit 50.

According to image forming apparatus 100C in the third embodiment of the present invention configured in this way, the effect described in the first embodiment can be similarly achieved.

(Fourth Embodiment)

Figure 6:
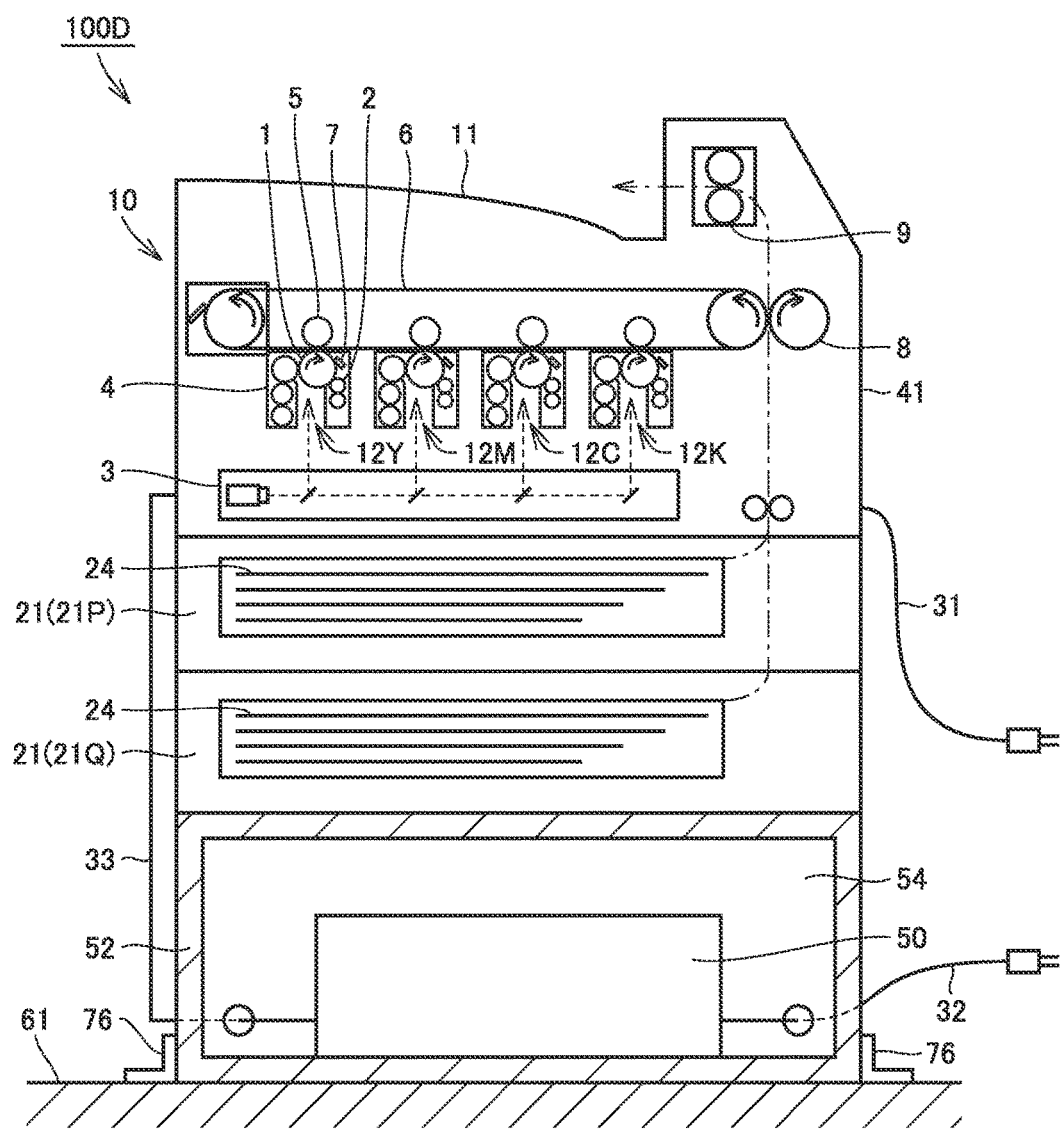
FIG. 6 is a cross-sectional view schematically showing the internal structure of an image forming apparatus in the fourth embodiment of the present invention.

FIG. 6 is a cross-sectional view schematically showing the internal structure of an image forming apparatus in the fourth embodiment of the present invention. The image forming apparatus in the present embodiment has a structure basically similar to that of image forming apparatus 100A in the first embodiment. The description of the identical structure will not be hereinafter repeated.

Referring to FIG. 6, image forming apparatus 100D in the present embodiment includes a fall prevention member 76 in place of caster 71 in the first embodiment. Fall prevention member 76 is configured to increase the installation area of image forming apparatus 100D on floor 61. In the present embodiment, fall prevention member 76 formed of an L-shaped angle member is provided at the lowermost part of cabinet 52.

By such a configuration, since image forming apparatus 100D is less likely to fall during an earthquake or the like, server unit 50 can be appropriately protected.

According to image forming apparatus 100D in the fourth embodiment of the present invention configured in this way, the effect described in the first embodiment can be similarly achieved.

(Fifth Embodiment)

Figure 7:
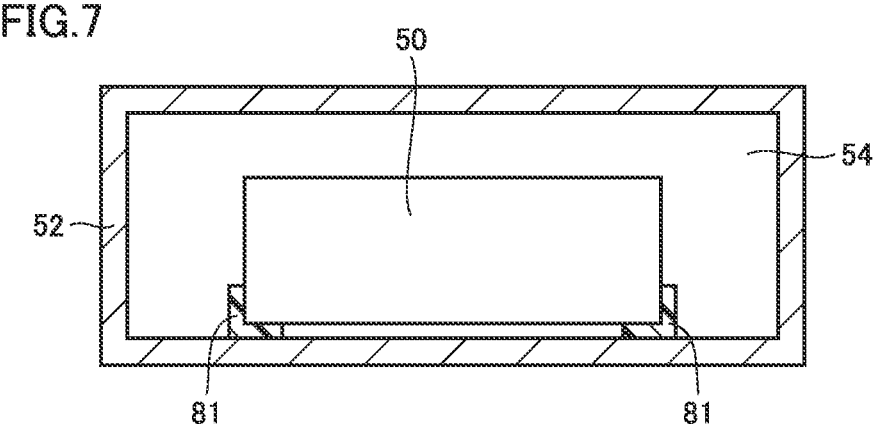
FIG. 7 is a cross-sectional view showing the inside of a cabinet in an image forming apparatus in the fifth embodiment of the present invention.

FIG. 7 is a cross-sectional view showing the inside of a cabinet in an image forming apparatus in the fifth embodiment of the present invention. The image forming apparatus in the present embodiment has a structure basically similar to that of image forming apparatus 100A in the first embodiment. The description of the identical structure will not be hereinafter repeated.

Referring to FIG. 7, the image forming apparatus in the present embodiment further includes a base member 81 as an anti-vibration member. Typically, base member 81 is made of rubber. Server unit 50 is supported by base member 81 inside cabinet 52. Server unit 50 is placed inside cabinet 52 with base member 81 interposed there between.

According to the configuration as described above, vibrations are less likely to be transmitted to server unit 50. Particularly in the present embodiment, server unit 50 is arranged at the bottom of the image forming apparatus. Thus, vibrations from the ground are more likely to be transmitted to server unit 50 during transportation of the image forming apparatus. Accordingly, it is important to take countermeasures against vibrations in installation of server unit 50.

Figure 8:
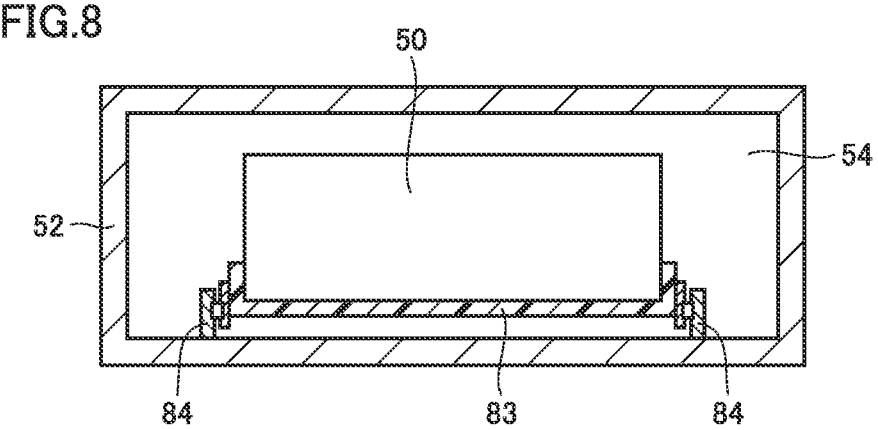
FIG. 8 is a cross-sectional view showing a modification of an anti-vibration member in FIG. 7.

FIG. 8 is a cross-sectional view showing a modification of an anti-vibration member in FIG. 7. Referring to FIG. 8, in the present embodiment, a tray 83 and an arm member 84 are provided as anti-vibration members for server unit 50.

Tray 83 has a tray shape so as to be capable of receiving server unit 50. Server unit 50 is placed on tray 83. Arm member 84 is placed on the bottom surface inside cabinet 52. Arm member 84 is configured such that it can be extended and contracted in the direction orthogonal to the aperture plane of opening 55j (see FIG. 3), that is, the direction in which server unit 50 is pulled out from cabinet 52.

By such a configuration, server unit 50 is placed away from cabinet 52, so that transmission of vibrations to server unit 50 can be suppressed. Furthermore, in the present modification, server unit 50 placed on tray 83 slides in accordance with extension and contraction of arm member 84, so that the workability during maintenance of server unit 50 can be improved.

According to the image forming apparatus in the fifth embodiment of the present invention configured in this way, the effect described in the first embodiment can be similarly achieved.

In addition, a new image forming apparatus may be configured by appropriately combining the structures of the image forming apparatuses in the first to fifth embodiments. For example, spacer member 73 in the third embodiment, fall prevention member 76 in the fourth embodiment, or the anti-vibration member for server unit 50 in the fifth embodiment may be combined with the image forming apparatus in the second embodiment.

The following is a summarized explanation of: the configuration of the image forming apparatus according to each of the embodiments as described above; and the functions and effects achieved by the image forming apparatus.

An image forming apparatus in one aspect of the present embodiment includes: an image forming unit configured to form an image on a recording medium; a server unit having a server function; a casing having the image forming unit housed therein; and a cabinet arranged below casing 41 and having the server unit housed therein. The cabinet serves as a partition between the image forming unit and the server unit, and is provided as a housing separately from the casing.

An image forming apparatus in another aspect of the present embodiment includes: an image forming unit configured to form an image on a recording medium; a server unit having a server function; and a partition member provided to serve as a partition between the image forming unit and the server unit. The server unit is arranged below the image forming unit.

According to the image forming apparatus configured in this way, a partition member is provided so as to serve as a partition between the image forming unit and the server unit, and the server unit is arranged below the image forming unit. Thus, it becomes possible to suppress an adverse effect on the server unit by the heat generated in the image forming unit.

Further preferably, the partition member is a cabinet in which the server unit is housed.

Further preferably, each of the casing and the cabinet serves as a partition between a first space including the image forming unit and a second space including the server unit.

According to the image forming apparatus configured in this way, the server unit is more reliably divided from the image forming unit, so that it becomes possible to further suppress an adverse effect on the server unit by the heat generated due to image formation.

Further preferably, the image forming unit includes a housing unit in which a recording medium is housed. The cabinet has a door unit. The housing unit and the door unit are provided on a first side surface of the image forming apparatus to be capable of being opened and closed.

According to the image forming apparatus configured in this way, since the server unit is readily accessible through the door unit, the maintenance performance for the server unit can be improved.

Further preferably, the image forming unit includes a housing unit in which a recording medium is housed. The cabinet has a door unit. The housing unit is provided on a first side surface of the image forming apparatus to be capable of being opened and closed. The door unit is provided on a second side surface of the image forming apparatus to be capable of being opened and closed. The second side surface faces in a direction different from the first side surface.

According to the image forming apparatus configured in this way, it becomes difficult to access the server unit through the door unit, so that the security performance for the server unit can be enhanced.

Further preferably, the cabinet includes a door unit that can be opened and closed, and a lock mechanism unit configured to restrict an operation to bring the door unit from a closed state into an opened state.

According to the image forming apparatus configured in this way, the security performance for the server unit can be enhanced.

Further preferably, the image forming unit includes a housing unit in which a recording medium is housed, the housing unit being provided on a first side surface of the image forming apparatus to be capable of being opened and closed. The lock mechanism unit is configured to allow a locking operation and an unlocking operation for the door unit to be performed on the first side surface.

According to the image forming apparatus configured in this way, the locking operation and the unlocking operation in the lock mechanism unit can be readily performed, so that excellent maintenance performance for the server unit can be achieved while enhancing the security performance for the server unit.

Further preferably, the image forming apparatus further includes a spacer member that is interposed between the cabinet and the image forming unit (the casing) to provide a space between the cabinet and the image forming unit (the casing).

According to the image forming apparatus configured in this way, it becomes possible to more effectively suppress an adverse effect on the server unit by the heat generated due to image formation.

Further preferably, the image forming apparatus further includes a transportation member or a fall prevention member provided at a lowermost part of the cabinet.

According to the image forming apparatus configured in this way, the convenience during transportation of the image forming apparatus can be enhanced, and damage to the server unit caused by falling of the image forming apparatus can be prevented.

Further preferably, the image forming apparatus further includes an anti-vibration member provided inside the cabinet and configured to support the server unit.

According to the image forming apparatus configured in this way, transmission of vibrations to the server unit can be suppressed.

Further preferably, the anti-vibration member is configured to support the server unit such that the server unit is slidable inside the cabinet.

According to the image forming apparatus configured in this way, it becomes possible to enhance the convenience at the time when the server unit is brought into or out from the cabinet.

Further preferably, the server unit is configured to be connectable to an external network. The image forming apparatus further includes: a first power supply unit for supplying electric power to the image forming unit; and a second power supply unit for supplying electric power to the server unit.

According to the image forming apparatus configured in this way, power feeding to the image forming apparatus and power feeding to the server unit can be performed independently from each other.

The present invention is mainly applied to an image forming apparatus integrally provided with a server unit.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus comprising:
   an image forming unit configured to form an image on a recording medium;

a server unit having a server function;
a casing having the image forming unit housed therein; and
a cabinet arranged below the casing;
wherein the server unit is provided within the cabinet;
wherein the cabinet forms a partition between the image forming unit and the server unit, and the cabinet is a different structure from the casing;
wherein the image forming unit comprises a transfer unit configured to transfer an image onto a recording medium, and a fixing device arranged above the transfer unit and configured to fix the image on the recording medium; and
wherein the casing in which the image forming unit is housed being arranged at a higher level than the cabinet in which the server unit is housed, the casing and the cabinet being united together into a housing of the image forming apparatus.

2. The image forming apparatus according to claim 1, wherein each of the casing and the cabinet serves as a partition between a first space including the image forming unit and a second space including the server unit.

3. The image forming apparatus according to claim 1, wherein
the image forming unit includes a housing unit in which a recording medium is housed,
the cabinet has a door unit, and
the housing unit and the door unit are provided on a first side surface of the image forming apparatus to be capable of being opened and closed.

4. The image forming apparatus according to claim 1, further comprising a spacer member interposed between the cabinet and the casing to provide a space between the cabinet and the casing.

5. The image forming apparatus according to claim 1, further comprising a transportation member or a fall prevention member provided at a lowermost part of the cabinet.

6. The image forming apparatus according to claim 1, further comprising an anti-vibration member provided inside the cabinet and configured to support the server unit.

7. The image forming apparatus according to claim 6, wherein the anti-vibration member is configured to support the server unit such that the server unit is slidable inside the cabinet.

8. The image forming apparatus according to claim 1, wherein
the server unit is configured to be connectable to an external network, and
the image forming apparatus further comprises:
a first power supply unit for supplying electric power to the image forming unit; and
a second power supply unit for supplying electric power to the server unit.

9. An image forming apparatus comprising:
an image forming unit configured to form an image on a recording medium;
a server unit having a server function;
a casing having the image forming unit housed therein; and
a cabinet arranged below the casing;
wherein the server unit is provided within the cabinet;
wherein the cabinet forms a partition between the image forming unit and the server unit, and the cabinet is a different structure from the casing;
wherein the image forming unit includes a housing unit in which a recording medium is housed,
the cabinet has a door unit,
the housing unit is provided on a first side surface of the image forming apparatus to be capable of being opened and closed, and
the door unit is provided on a second side surface of the image forming apparatus to be capable of being opened and closed, the second side surface facing in a direction different from the first side surface.

10. An image forming apparatus comprising:
an image forming unit configured to form an image on a recording medium;
a server unit having a server function;
a casing having the image forming unit housed therein; and
a cabinet arranged below the casing;
wherein the server unit is provided within the cabinet;
wherein the cabinet forms a partition between the image forming unit and the server unit, and the cabinet is a different structure from the casing;
wherein the cabinet includes
a door unit that can be opened and closed, and
a lock mechanism unit configured to restrict an operation to bring the door unit from a closed state into an opened state.

11. The image forming apparatus according to claim 10, wherein
the image forming unit includes a housing unit in which a recording medium is housed, the housing unit being provided on a first side surface of the image forming apparatus to be capable of being opened and closed, and
the lock mechanism unit is configured to allow a locking operation and an unlocking operation for the door unit to be performed on the first side surface.

* * * * *